United States Patent

Nakamura et al.

[11] Patent Number: 5,148,281
[45] Date of Patent: Sep. 15, 1992

[54] IRIS STABILIZER FOR AUTOMATIC VIDEO CAMERA

[75] Inventors: Takashi Nakamura; Yoshikazu Nishimura, both of Kanagawa, Japan

[73] Assignee: Sony Corporation, Japan

[21] Appl. No.: 656,850

[22] Filed: Feb. 19, 1991

[30] Foreign Application Priority Data

Mar. 24, 1990 [JP] Japan .................................. 2-74987

[51] Int. Cl.⁵ ...................... H04N 5/238; H04N 5/225
[52] U.S. Cl. .................................... 358/228; 358/909
[58] Field of Search ................... 358/228, 213.19, 909; 354/446, 449, 450, 451, 452; 352/141

[56] References Cited

U.S. PATENT DOCUMENTS

| 3,767,853 | 10/1973 | Bendell et al. | 358/228 |
| 4,365,272 | 12/1982 | Nagai | 358/228 |
| 4,399,466 | 8/1983 | Stephenson | 358/228 |
| 4,564,856 | 1/1986 | Sanderson et al. | 352/141 |
| 4,638,350 | 1/1987 | Kato et al. | 358/228 |

FOREIGN PATENT DOCUMENTS 60-167576 8/1985 Japan .................................. 358/228

Primary Examiner—Michael Razavi
Assistant Examiner—Wendy R. Greening
Attorney, Agent, or Firm—Ronald P. Kananen

[57] ABSTRACT

An iris control for a video camera which includes a manual adjuster and an automatic control. A video signal from an image pickup element is detected when it reaches a reference level. A unit to be activated for changing this iris is selectively changed-over between the manual and automatic control units, and the state of the iris is prevented from being changed when the unit to be activated is changed-over.

6 Claims, 2 Drawing Sheets

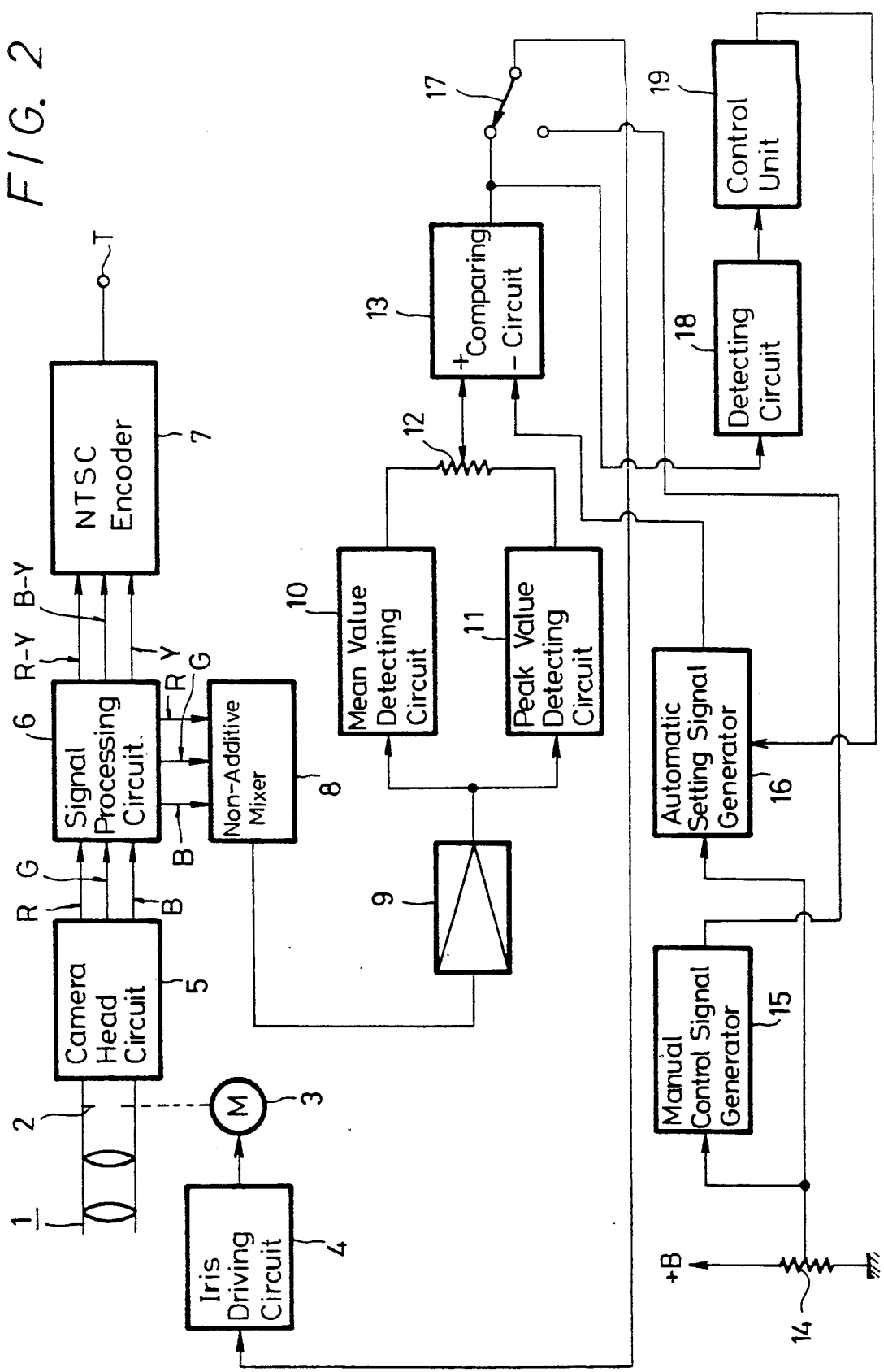

IRIS STABILIZER FOR AUTOMATIC VIDEO CAMERA

BACKGROUND OF THE INVENTION

1. Field of the Invention

The present invention generally relates to an iris control apparatus for a video camera and is directed more particularly to an iris control apparatus for use with a video camera having manual and automatic modes for manually and automatically controlling the iris, respectively.

2. Description of the Prior Art

A typical example of conventional iris control apparatus for a video camera will be explained hereinafter with reference to FIG. 1.

In FIG. 1, a reference numeral 1 designates a lens system and 2 an iris. The iris 2 is driven by a motor 3 which is driven by an iris drive circuit 4. A camera head circuit 5 is provided which has a charge coupled device (hereinafter abbreviated as a CCD) for delivering image pickup signals of three colors (blue, green and red) sample and hold circuits for sampling and holding the three color image pickup signals respectively, and pre-process circuits for performing gain adjustments, flare correction and pre-knee correction, etc., with respect to the three color image pickup signals and so on, respectively.

The red, green and blue chrominance signals R, G and B from the camera head circuit 5 are supplied to a signal processing circuit 6. The signal processing circuit 6 has a matrix circuit for generating red and blue color difference signals R - Y and B - Y and a luminance signal Y on the basis of the red, green and blue signals R, G and B, a gamma correction circuit, a knee correction circuit and an automatic white and black level balance adjusting circuit, etc.

An encoder 7 of National Television System Committee's system (hereinafter abbreviated as a NTSC system) encodes the red and blue color difference signals R - Y and B - Y and the luminance signal Y to generate a composite color video signal of the NTSC system and delivers the same to an output terminal T.

A non-additive mixer (hereinafter abbreviated as NAM) 8 delivers the signal having a maximum level among the red, green and blue signals R, G, and B supplied thereto from the signal processing circuit 6 (or the camera head circuit 5). The chrominance signal with the maximum level from the NAM 8 is supplied through an amplifier 9 to a mean-value detecting circuit 10 and a peak value detecting circuit 11. The detected output signals from the circuits 10 and 11 are mixed with a proper mixing ratio by a potentiometer 12 and then the mixed value (level of the weighted sum of the mean value and the peak value) from the potentiometer 12 is supplied to a comparing circuit 13 so as to be compared with a reference level E supplied thereto from a reference power source 20. The comparing circuit 13 delivers an iris control signal in an automatic mode with such a level as to make the mixed level equal to the reference level E that is, it drives the mixed level to the reference level E. The iris control signal is supplied to the iris control circuit 4 through a manual-/automatic mode change-over switch 17.

A manual adjuster 21 constituted by a potentiometer connected between a power supply source +B and ground generates an iris control signal in a manual mode, which is supplied through the change-over switch 17 to the iris driving circuit 4. One of the iris control signals from the manual adjuster 21 and the comparing circuit 13 is selected by the change-over switch 17 and supplied to the iris driving circuit 4 to thereby control an aperture of the iris 2 manually and automatically, respectively.

In the conventional iris control apparatus for a video camera described above, the automatic iris control signals from the comparing circuit 13 and the manual iris control signal from the manual adjuster 21 are independently set, that is, without any relation therebetween. Thus, if there is a level difference between these automatic and manual iris signals before and after changing over the switch 17, there arises such a drawback that the aperture of the iris 2 changes abruptly upon changing over the switch 17.

OBJECTS AND SUMMARY OF THE INVENTION

Accordingly, it is an object of the present invention to provide an iris control apparatus for a video camera overcoming the above-described drawbacks of the conventional iris control apparatus.

It is another object of the present invention to provide an iris control apparatus for a video camera which is capable of preventing the aperture of the iris from being changed in case of changing over between the manual and automatic modes for manually and automatically controlling the iris, respectively.

According to an aspect of the present invention, there is provided an iris control apparatus for a video camera including a manual control unit for manually controlling an iris by means of a manual adjuster, an automatic control unit for automatically controlling the iris in accordance with a detected level of a video signal from an image pickup element in a manner that the detected level is driven to a preset level, a change-over unit for selectively changing the video camera over between the manual and automatic control units, and a stabilizing or preventing unit for preventing the state of the iris from being changed when the manual or automatic mode is changed by switching the change-over unit.

The above and other objects, features, and advantages of the present invention will become apparent from the following detailed description of an illustrative embodiment thereof to be read in conjunction with the accompanying drawings, in which like reference numerals represent the same or similar parts.

BRIEF DESCRIPTION OF THE DRAWINGS

FIG. 2 is a block diagram illustrating an embodiment of an iris control apparatus for a video camera according to the present invention.

DETAILED DESCRIPTION OF THE PREFERRED EMBODIMENT

Figure 1:
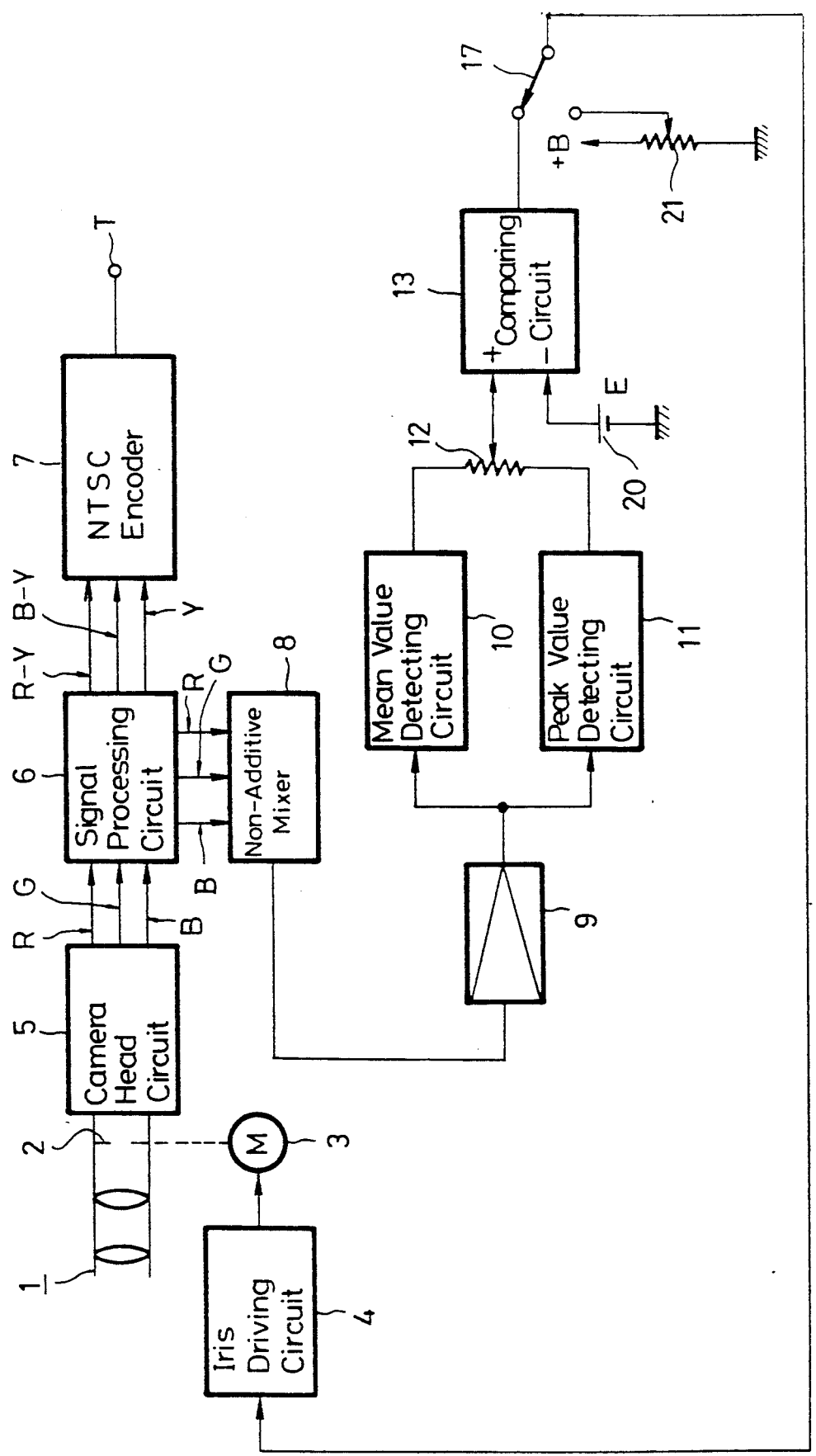
FIG. 1 is a block diagram illustrating a conventional iris control apparatus for a video camera.

A preferred embodiment of the present invention will be explained in detail with reference to FIG. 2, in which the same reference numerals illustrate respective elements in FIG. 1 having the same or similar functions the explanations thereof being accordingly omitted.

An adjuster 14 constituted by a potentiometer connected between a power source +B and ground generates a control signal for manually adjusting an iris 2 and also for adjusting a reference level used for automatically controlling the iris 2. A manual control signal generator 15 and an automatic setting signal generator 16 respectively generate a manual control signal and an automatic setting signal, each level thereof changing in accordance with the level of the control signal from the adjuster 14. The automatic setting signal generator 16 changes the output level of the automatic setting signal in accordance with an output from a control unit 19 when the generator 16 is controlled by the control unit 19 which is preferably constituted by a central processing unit (CPU), as described later.

The manual control signal, that is, an iris control signal from the manual control signal generator 15 is applied to an iris driving circuit 4 through a manual-/automatic mode change-over switch 17.

The automatic setting signal from the automatic setting signal generator 16 is applied to a comparing circuit 13, which has the function of amplifying an input with a high gain, as a reference level signal.

An iris control signal from the comparing circuit 13 is applied to the iris driving circuit 14 through the manual-/automatic mode change-over switch 17 and is also applied directly to a detection circuit 18. The circuit 18 detects the level of the iris control signal and applies its detected level to the control unit 19, which in turn controls the level of the automatic setting signal generated by the generator 16 in accordance with the detected level.

An operation of this iris control apparatus for a video camera will be described below. To place the video camera in the automatic mode for automatically controlling the iris 2, the manual/automatic mode change-over switch 17 is changed over to the side of the comparing circuit 13. According to the setting of the adjuster 14 as set by hand by the user of the video camera, the automatic setting signal generator 16 generates an automatic setting signal whose level depends on the control signal from the adjuster 14, and applies it to the comparing circuit 13 as a reference level signal. The comparing circuit 13 therefore generates an iris control signal with a level V1 such that the level of the mixed values of the mean and peak of the chrominance signal with the maximum level from the NAM 8 becomes equal to the level of the automatic setting signal, i.e., the reference level. The output of the comparing circuit 13 is applied as the iris control signal to the iris driving circuit 4 through the switch 17, to thereby control the aperture of the iris 2.

To place the video camera in the manual mode for manually controlling the iris 2, the switch 17 is changed over to the side of the manual control signal generator 15. In this case, if the level of the manual control signal, that is, the iris control signal from the manual control generator 15 is set to be equal to the level V1 of the iris control signal from the comparing circuit 13 in the automatic mode, even when the operating mode is changed over from the automatic mode to the manual mode by changing the manual/automatic mode change-over switch 17, the level of the iris control signal applied to the iris control driving circuit 4 will not change as long as the adjuster 14 is not adjusted. Therefore, the aperture of the iris 2 is not changed.

In the manual mode, when the adjuster 14 is adjusted, the manual control signal generator 15 generates the manual control signal, that is, an iris control signal whose level depends on the degree of the adjustment of the adjuster 14, and applies it to the iris driving circuit 4 as the iris control signal through the switch 17.

Thereby the aperture of the iris 2 is controlled in accordance with the degree of the adjustment (i.e., a level of the control signal) of the adjuster 14.

In the manual mode, a closed loop composed of the comparing circuit 13, the detection circuit 18, the control unit 19 and the automatic setting signal generator 16 is operated in a manner described below. Namely, in the case where the level of the iris control signal from the automatic setting signal generator 16 is constant, if the level of the mixed values of the mean and peak values of the chrominance signal with the maximum level from the NAM 8 changes, the level of the iris control signal output from the comparing circuit 13 changes accordingly Thus, when the level of the manual control signal, that is, the iris control signal from the manual control signal generator 15 is V2, a corresponding level of the iris control signal from the comparing circuit 13 is detected by the detection circuit 18. Then the control unit 19 controls the automatic setting signal generator 16 in a manner that the detected level of the iris control signal from the comparing circuit 13 becomes V2. In other words, the level of the automatic setting signal to changes. Accordingly, even if the operating mode is changed over from the manual mode to the automatic mode by changing over the switch 17, the level of the iris control signal applied to the iris driving circuit 4 is maintained at V2, so that the aperture of the iris 2 is prevented from being changed.

To accomplish this, the control unit 19 has prestored control data for determining how to control the output level of the automatic setting signal of the automatic setting signal circuit 16. Specifically, this predetermined control data is provided so as to set the level of the iris control signal from the comparing circuit 13 to be Vx when the level of the iris control signal from the manual control signal generator 15 is Vx.

In the present invention, the circuit configuration of FIG. 2 may be modified in a manner that an amplifier 9 receives the luminance signal Y from the signal processing circuit 6 instead of the chrominance signal with the maximum level from the NAM 8.

According to the present invention, in an iris control apparatus for a video camera having manual and automatic modes for manually and automatically controlling the iris respectively, it becomes possible to prevent the state of the aperture of the iris from being changed in case of changing over between the manual and automatic modes.

Having described the preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

We claim as our invention:

1. An iris control apparatus for a video camera comprising:
   manual control means for manually controlling an iris of the video camera in a manual mode by means of a manual adjuster, the state of said iris in said manual mode accordingly depending on the state of said manual adjuster;
   automatic control means for automatically controlling said iris in an automatic mode in accordance with a detected level of a video signal from an image pickup element, wherein said automatically controlling is performed in a manner that the state of said iris is changed to where said detected level becomes a reference level;

change-over means selectively activated by a user of the video camera for selecting between operation by said manual control means in said manual mode and operation by said automatic control means in said automatic mode; and preventing means for preventing the state of said iris from being changed when said change-over means is activated to switch between said manual and automatic modes.

2. An iris control apparatus according to claim 1, wherein said manual control means includes a manual adjuster and means for generating a first iris control signal for controlling the state of said iris according to the level set by said manual adjuster, said automatic control means includes means for generating a second iris control signal for controlling the state of said iris in accordance with said detected level and said reference level, and said preventing means includes means for equalizing the levels of said first and second iris control signals when said change-over means is activated to switch from said manual mode to said automatic mode.

3. An iris control apparatus according to claim 2, wherein said preventing means sets the level of said second iris control signal to be equal to the level of said first iris control signal when said change-over means is switched from said manual mode to said automatic mode.

4. An iris control apparatus according to claim 1, wherein said preventing means sets the level of said first iris control signal to be equal to the level of said second iris control signal when said change-over means is switched from said automatic mode to said manual mode.

5. An iris control apparatus according to claim 2, wherein:

said change-over means includes two inputs and an output, a first of said two inputs being said first iris control signal from said manual control means and the second of said two inputs being said second iris control signal from said automatic control means, said output providing the respective selected one of said first and second iris control signals for said controlling of said iris;

said manual control means including a manual control signal generator having as an input an output of said manual adjuster and as an output said first iris control signal; and said automatic control means including a comparing circuit having as a first input said detected signal, as a second input said reference signal, and as an output said second iris control signal, and an automatic setting signal generator having as a first input said output of said manual adjuster and as an output said reference level which is said second input of said comparing circuit, said automatic setting signal generator having a second input;

wherein said comparing circuit acts to provide said second iris control signal so that said detected signal is driven to said reference level when said change-over means is set for said automatic mode.

6. An iris control apparatus according to claim 5, wherein said preventing means comprises:

a detecting circuit having as an input said output of second iris control signal output from said comparing circuit, said detecting circuit providing an output; and a control unit having as an input said output of said detecting circuit, said control unit having an output which is said second input of said automatic setting signal generator;

wherein, for said equalizing of said first and second iris control signals for when said change-over means is switched from said manual to said automatic mode, said control unit controls said output of said automatic setting signal generator.

* * * * *